United States Patent
Nishida et al.

[11] Patent Number: 6,141,167
[45] Date of Patent: Oct. 31, 2000

[54] COMPENSATING CIRCUIT, EQUALIZER AND MAGNETIC RECORDING/REPRODUCING APPARATUS USING THE SAME

[75] Inventors: Yasutaka Nishida, Kokubunji; Naoki Satoh, Odawara, both of Japan

[73] Assignee: Hitachi, Ltd., Tokyo, Japan

[21] Appl. No.: 08/969,482

[22] Filed: Nov. 13, 1997

[30] Foreign Application Priority Data

Nov. 14, 1996 [JP] Japan ................................... 8-302699

[51] Int. Cl.⁷ ........................................................ G11B 5/35
[52] U.S. Cl. ................................ 360/65; 360/46; 360/53
[58] Field of Search ................................ 360/65, 46, 67, 360/53, 32; 708/323; 375/232; 327/553; 341/50

[56] References Cited

U.S. PATENT DOCUMENTS

| 5,283,521 | 2/1994 | Ottesen et al. . |
| 5,400,189 | 3/1995 | Sato et al. ................................... 360/65 |
| 5,418,660 | 5/1995 | Sato et al. . |
| 5,790,335 | 8/1998 | Sugawara et al. ......................... 360/68 |
| 5,862,007 | 1/1999 | Pham et al. ................................ 360/65 |
| 5,872,668 | 2/1999 | Muto ........................................ 360/65 |

FOREIGN PATENT DOCUMENTS

| 5205205A | 8/1993 | Japan . |
| 5266403A | 10/1993 | Japan . |
| 644510A | 2/1994 | Japan . |
| WO96/18189 | 6/1996 | WIPO . |

*Primary Examiner*—Alan T. Faber
*Attorney, Agent, or Firm*—Kenyon & Kenyon

[57] ABSTRACT

A compensating circuit for compensating positive-negative asymmetry of an input signal having an amplitude exhibiting a positive-negative asymmetry with reference to a given level. Either one of the input signal or a signal obtained by multiplying the input signal by a given number is selected to be outputted as a compensated signal when the input signal has a level higher than a threshold level or alternatively when the input signal has a level lower than the threshold level. Distortion of signal waveforms ascribable to non-linearity of an MR head can be compensated satisfactorily with an extremely simplified and inexpensive circuit structure.

14 Claims, 7 Drawing Sheets

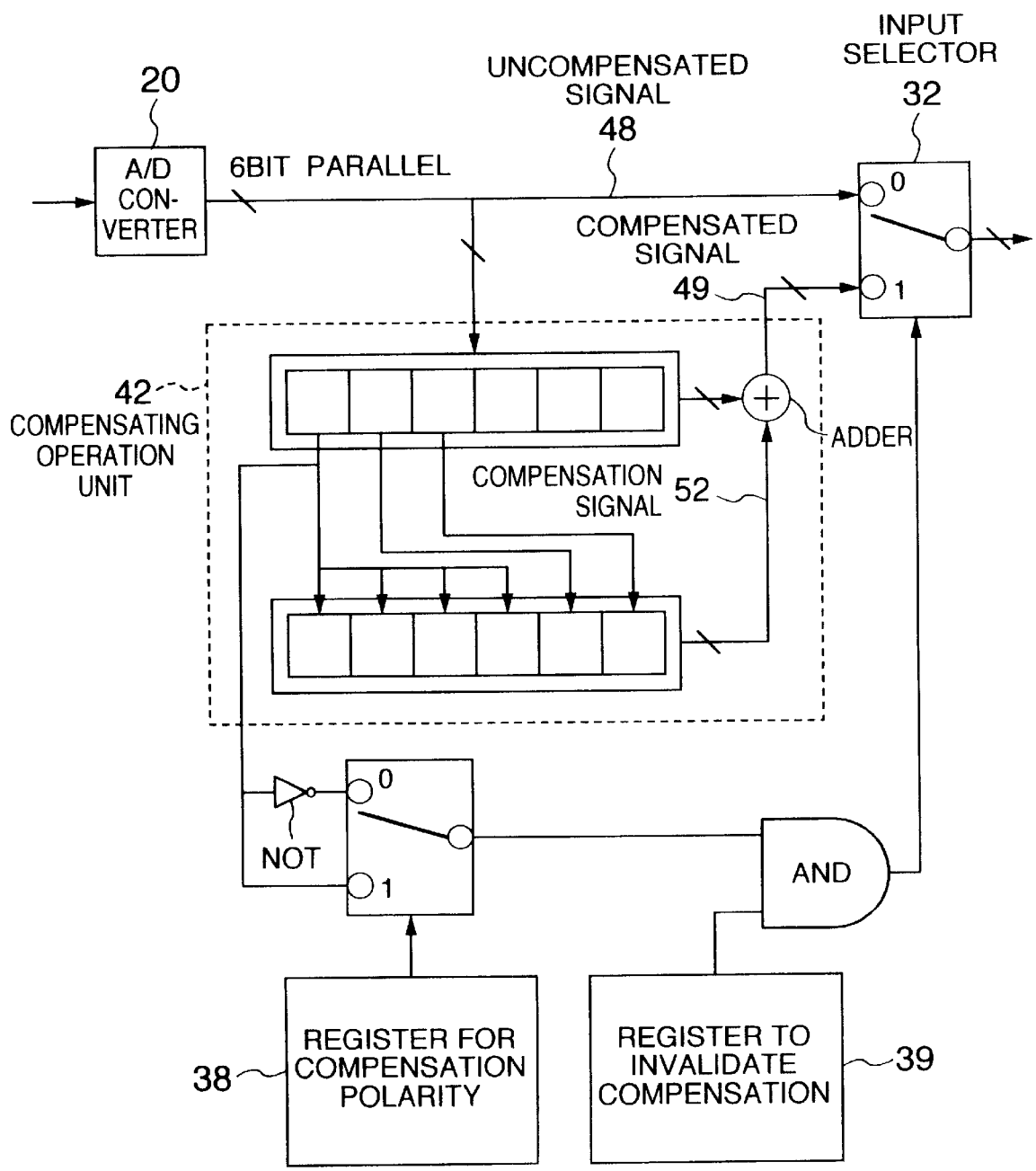

COMPENSATING CIRCUIT, EQUALIZER AND MAGNETIC RECORDING/ REPRODUCING APPARATUS USING THE SAME

BACKGROUND OF THE INVENTION

The present invention relates to a compensating circuit and an equalizer for correcting or compensating a positive-negative asymmetry of a reproduced signal outputted from a magnetoresistive head or the like. Further, the invention is concerned with a magnetic recording/reproducing apparatus using the compensating circuit and the equalizer.

In the field of the magnetic disk apparatus, there is an increasing trend of implementing a reproducing head with high sensitivity in an effort to realize a high-density package, which has led to a development of a reproducing head based on magnetoresistive effect or giant magnetoresistive effect. Hereinafter, these head will be referred to also as the MR head. The MR head is now replacing the conventional inductive head.

For having better understanding of the invention, description will be made in some detail of the technical background thereof. The non-linearity of the MR head will be briefly reviewed by reference to FIG. 8. The MR head is so designed as to perform a signal reproduction by making use of a magnetic field-versus output conversion characteristic curve 76 of a magnetoresistive element such as illustrated in FIG. 8. The MR head is implemented such that a bias field is applied to the magnetoresistive element for determining which portion of the magnetic field-versus-output conversion characteristic curve 76 is to be used. More specifically, the bias field 73 is superposed on the input field 71 applied from a magnetized recording medium so that an active region 74 is established on a linear portion of the magnetic field-versus-output conversion characteristic curve 76. To this end, there have been proposed a head structure in which the active region is controlled by a magnetic field generated by the bias current or by making use of the interlayer coupling (or magnetic interaction) among a sense current applied to the magnetoresistive element, magnetization of the magnetoresistive element and the bias field generated by a biasing magnetic layer. For this reason, non-linearity represented typically by the positive-negative asymmetry (i.e., asymmetry of output waveform with reference to a given level) may make appearance in the reproduced waveform 72 due to deviation of the bias current, dispersion of the magnetic characteristic of the magnetoresistive elements and other factors. In general, the signal processing system is designated on the presumption that the magnetic recording/reproducing system is of linear property. Thus, the asymmetry presents a very influential factor for degradation of the system performance. Under being the circumstances, there has been proposed a method of protecting the system against performance degradation mentioned above by compensating (or correcting) the non-linearity before the signal outputted from the MR head is inputted to an equalizer. According to the compensating method in which non-linearity compensating analogue-to-digital conversion (hereinafter referred to as the A/D conversion) is adopted, the scale of an A/D converter is set to one of different values in dependence on whether the input signal to the A/D converter assumes positive or negative polarity, for thereby compensating the positive-negative asymmetry of the reproduced waveform. For more particular, refer to Japanese Unexamined Patent Application Publication No. 205205/1993 (JP-A-5-205205). Further, according to an adaptive digital linearization method and apparatus for compensating the asymmetry of the output signal of the MR head (refer to Japanese Unexamined Patent Application Publication No. 44510/1994 (JP-A-6-44510)), amplitude values of the reproduced signal are compensated or collected by reference to a look-up table after the A/D conversion of the reproduced signal. To this end, the characteristics of the individual MR heads are previously measured by changing the bias field applied thereto, and when the characteristic of the MR head changes, compensation therefor is effectuated by correcting the amplitude value by referencing the look-up table as stored. Additionally, as another method of correcting or compensating the non-linearity of the reproduced signal before being inputted to the equalizer, there may be mentioned a method of canceling out the non-linearity by approximating the characteristic reverse to the magnetic field-versus-output voltage conversion property with a degree-N function (where N=3 or so). Besides, there has also been proposed a method of suppressing degradation due to the non-linearity by optimizing the equalization target of a FIR filter (finite impulse response filter. Reference may be made to Japanese Unexamined Patent Application Publication No. 266403/1993 (JP-A-5-266403)). Moreover, such a method is also known according to which non-linearities inclusive of non-linear transition shift (bit shift) by resorting to the use of an equalizer constituted by a combination of a decision feedback equalizer and a RAM (random access memory).

The scheme of canceling out or compensating the non-linearity of the output signal of the MR head before being inputted to the equalizer is certainly effective. However, in order to cancel out the non-linearity satisfactorily or completely, there will be demanded a canceler of complicated characteristics, realization of which needs arithmetic circuits of complicate structure and/or a memory of large capacity, leading to increasing in the system scale and the manufacturing cost. Further, the method of compensating the non-linearity of the output of the MR head by using the A/D converter itself is difficult to realize in an LSI (Large Scale Integrated circuit) with high accuracy because the voltages applied to the components of the A/D converter circuit and the load will change upon regulation of the reference voltage for changing the scaling. Besides, in the method mentioned just above, the asymmetry compensation coefficient (or correcting coefficient) is set in terms of an analogue value of the reference voltage for the A/D converter. Consequently, due to dispersions of the circuit elements and other factors, difficulty will be encountered in realizing the compensation of the non-linearity of the output signal of the MR head.

At this juncture, it should however be mentioned that the compensation of the non-linearity of the output signal of the MR head is basically to improve the so-called error rate, for which perfect or complete cancellation of the non-linearity is not necessarily demanded. The portion of the characteristic curve of the MR head which exerts most remarkable influence to the error rate is the portion where distortion is extremely large. In this conjunction, it is noted that when the positive and negative amplitudes of the waveform of the nonlinear output of the MR head are asymmetrical, the distortion mentioned above makes appearance most remarkably in the signal portion where the amplitude thereof is large. Accordingly, by performing the amplitude compensation or correction for such signal portion, it is possible to improve the error rate with enhanced efficiency.

SUMMARY OF THE INVENTION

In the light of the state of the art described above, it is an object of the present invention to provide a magnetic recording/reproducing apparatus of high package density which is capable of generating an output signal which suppressing to a possible minimum the error rate due to the non-linearity of the characteristic of the MR head minimum by realizing a non-linearity compensating equalizer capable of canceling out the non-linearity with an extremely simplified circuit configuration so that output of the recording/reproducing system using the MR head can be processed by the conventional linear signal processing system.

In view of the above and other objects which will become apparent as the description proceeds, there is provided according to a general aspect of the present invention a compensating circuit, which will be described below by reference to FIG. 1 for illustrating the principle or concept underlying the present invention.

The compensating circuit according to the invention is designed for compensating a positive-negative asymmetry of an input signal 1 having an amplitude exhibiting a positive-negative asymmetry with reference to a given level. To this end, the compensating circuit is composed of a unit for selecting by means of an input selector 4 either one of the input signal 1 or a signal obtained by multiplying the input signal by a given number by means of a compensation operating unit 3 for thereby outputting the selected signal, a unit for deciding whether the input signal 1 is greater or smaller than a threshold level 6 by a comparator 7, and a unit (selector controller 5) for selectively determining whether the compensated signal is to be outputted either when the input signal has a level higher than a threshold level or when the input signal has a level lower than the threshold level. The unit mentioned just above is further imparted with a function capable of outputting constantly the uncompensated value.

In a preferred mode for carrying out the invention, there may be adopted an arrangement for equalizing by using a FIR (finite impulse response) filter 2 the waveform of the signal compensated in respect to the positive-negative asymmetry.

In another preferred mode for carrying out the invention, there may be provided a digital arithmetic operation circuit for arithmetically processing a digitized signal outputted from an analog-to-digital converter, wherein the circuit may include a unit for determining a value multiplied by power of ½ by shifting an absolute value part of the input signal to thereby add or subtract the value to or from the input signal.

In yet another preferred mode for carrying out the invention, there may be provided a unit for adding to or subtracting from the input signal the absolute value part of the input signal shifted by three bits, i.e., a value of ⅛ of the input signal.

In a further preferred mode for carrying out the invention, when the threshold level for decision for selecting the output value is zero, the decision for selecting the output value may be made on the basis of a code bit of the input signal.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 6 is a schematic block diagram showing a circuit configuration of an asymmetry compensation equalizer according to a third embodiment of the invention;

DESCRIPTION OF THE PREFERRED EMBODIMENTS

Figure 1:
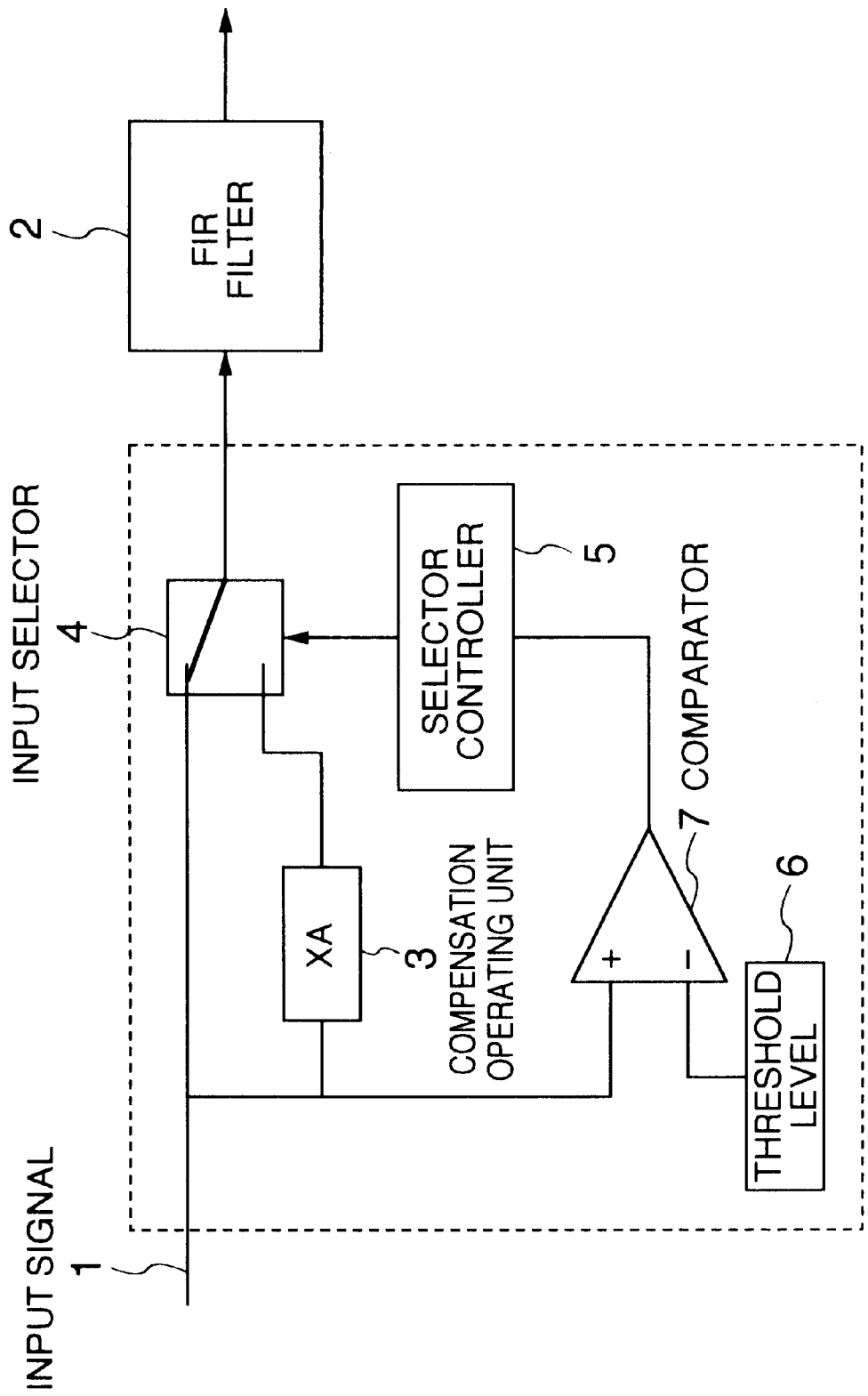
FIG. 1 is a schematic block diagram for illustrating the principle or concept underlying the present invention.

Now, the present invention will be described in detail in conjunction with what is presently considered as preferred or typical embodiments thereof by reference to the drawings. In the following description, like reference characters designate like or corresponding parts throughout the several views.

EMBODIMENT 1

In the compensating circuit for the magnetic recording/reproducing apparatus according to a first embodiment of the invention, an asymmetry compensation equalizer implemented according to the teaching of the present invention is employed in place of the equalizer in a PRML (Partial Response Maximum Likelihood) signal processing system.

Figure 2:
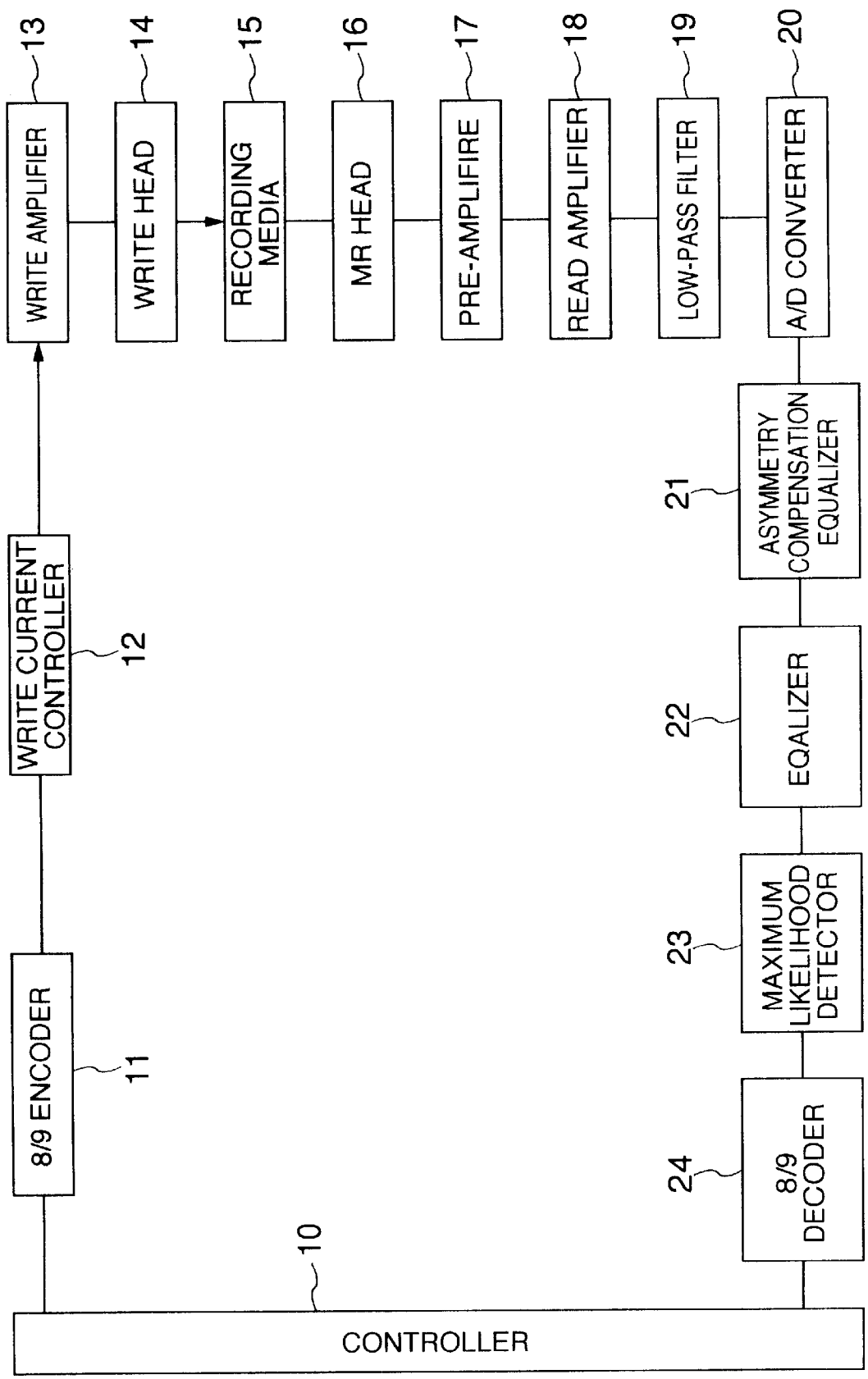
FIG. 2 is a schematic block diagram showing generally and functionally a structure of a recording/reproducing system in a magnetic disk apparatus according to a first embodiment of the present invention.

FIG. 2 is a schematic block diagram showing generally a structure of a recording/reproducing system of a magnetic disk apparatus according to the first embodiment of the invention. Referring to FIG. 2, a controller 10 outputs user data in accordance with instructions issued by a machine of hierarchically higher rank such as a computer or the like. The user data is inputted to an ⅞ encoder 11 to be converted into an ⅞ code signal which is then supplied to a write current controller 12 designed for performing controls such as write pre-compensation and others. Under the control of the write current controller 12, a write amplifier 13 generates a write current, whereby recording on a recording media 15 is carried out by means of a write head 14. Upon reproduction, the signal picked up by the MR head 16 is amplified through cooperation of a pre-amplifier 17 and a read amplifier 18, the output signal of which undergoes processing for eliminating extraneous high-frequency noise by a low-pass filter (LPH) 19 to be subsequently converted into a digital signal by a 6-bit A/D converter (ADC) 20. The digital reproduced signal outputted from the A/D converter 20 is corrected or compensated in respect to the positive-negative asymmetry which is ascribable to the non-linearity characteristic of the MR head by an asymmetry compensation equalizer 21 which is provided according to the teachings of the invention and then undergoes equalization into waveform of class 4PR by means of an equalizer 22. At this juncture, it should be mentioned that the equalizer is implemented in the form of a FIR (Finite Impulse Response) filter or transversal filter with seven taps. The output signal of the equalizer 22 is decoded by a maximum likelihood detector 23 to be subsequently converted into user data from the 8/9 code by means of an 8/9 decoder 24.

Figure 3:
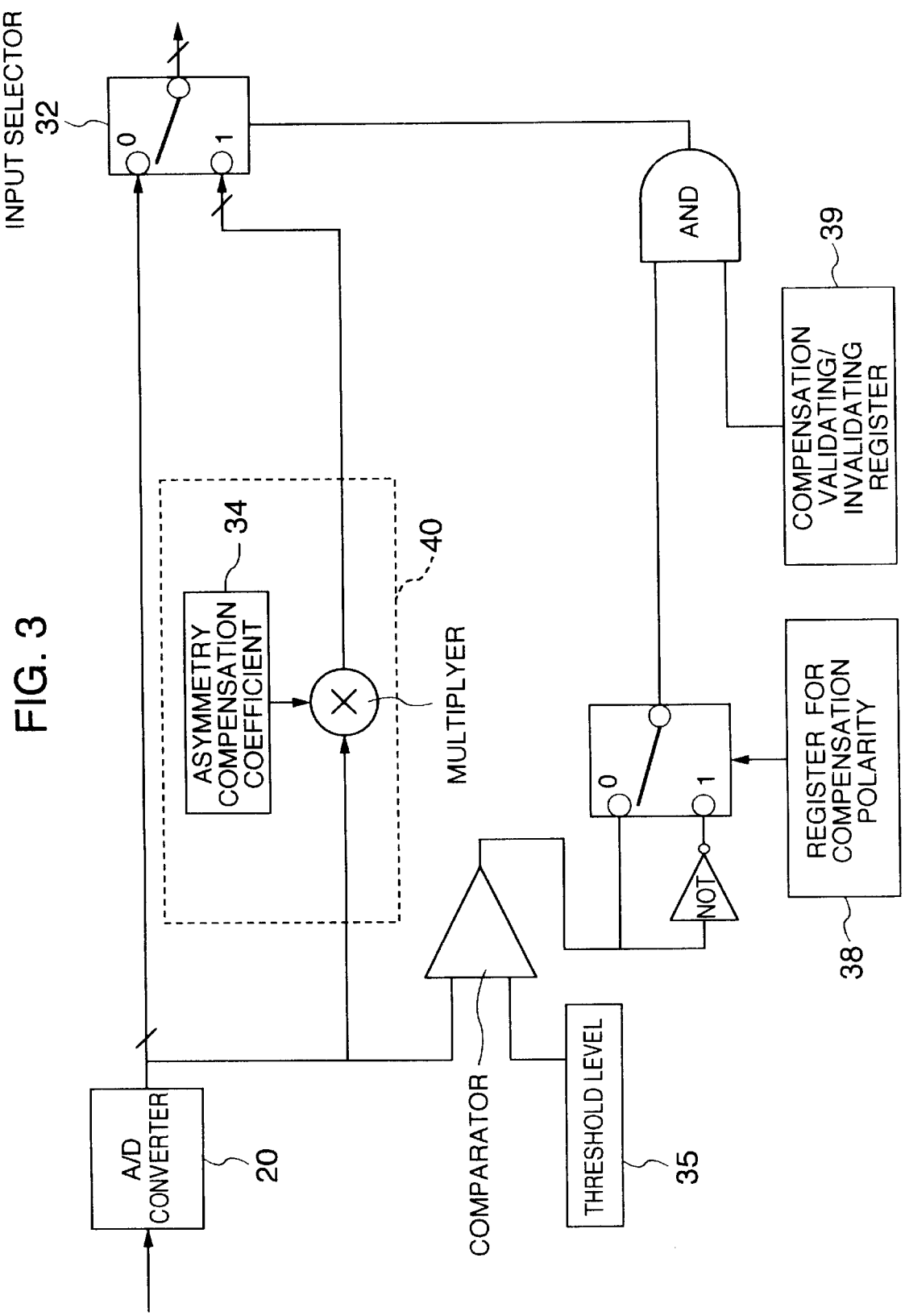
FIG. 3 is a schematic block diagram showing a circuit configuration of an asymmetry compensation equalizer according to the first embodiment of the invention.

Now, description will be directed to the circuit configuration of the asymmetry compensation equalizer by reference to FIG. 3. For each of the samples of the digital reproduced signal outputted from the A/D converter 20 and sampled at predetermined time points, there are outputted from a compensating operation unit 40 two values, i.e., intact value and value multiplied by an asymmetry compensation coefficient 34. Each of the samples is compared with a threshold level 35 by a comparator, whereby result of the comparison is outputted as the bit "1" or "0". The bit "1" or "0" signal is used as the select signal for selecting either one of the two values mentioned above. To this end, a compensation polarity selecting register 38 is provided for selecting as the compensated output value the compensated or corrected value greater than the threshold level or the value smaller than the threshold level. More specifically, by the compensation polarity selecting register 38, either the result of the comparison with the threshold level 35 or the inversion of the comparison result is selected. Additionally, there is provided a compensation invalidating register 39 for selecting the invalidated compensation in any case. The output of the compensation invalidating register 39 is logically ANDed with the output of the compensation polarity selecting register 38 for controlling the input selector 32. Accordingly, so long as the output of the compensation invalidating register 39 is "0", the input selector 32 always selects the input "0", as a result of which the data resulting from the A/D converter (ADC) 20 is outputted intact, i.e., as it is. The control performed through cooperation of the two registers 38 and 39 corresponds to that of the selector controller 5 described previous by reference to FIG. 1.

Incidentally, in the equalizer according to the instant embodiment of the invention, the asymmetry compensation coefficient 34 and the threshold level 35 can be set such that the equalization error or error rate is minimum.

EMBODIMENT 2

The second embodiment of the invention will now be described. It should first be mentioned that the second embodiment differs from the first embodiment only in respect to the structure of the asymmetry compensation equalizer.

Figure 4:
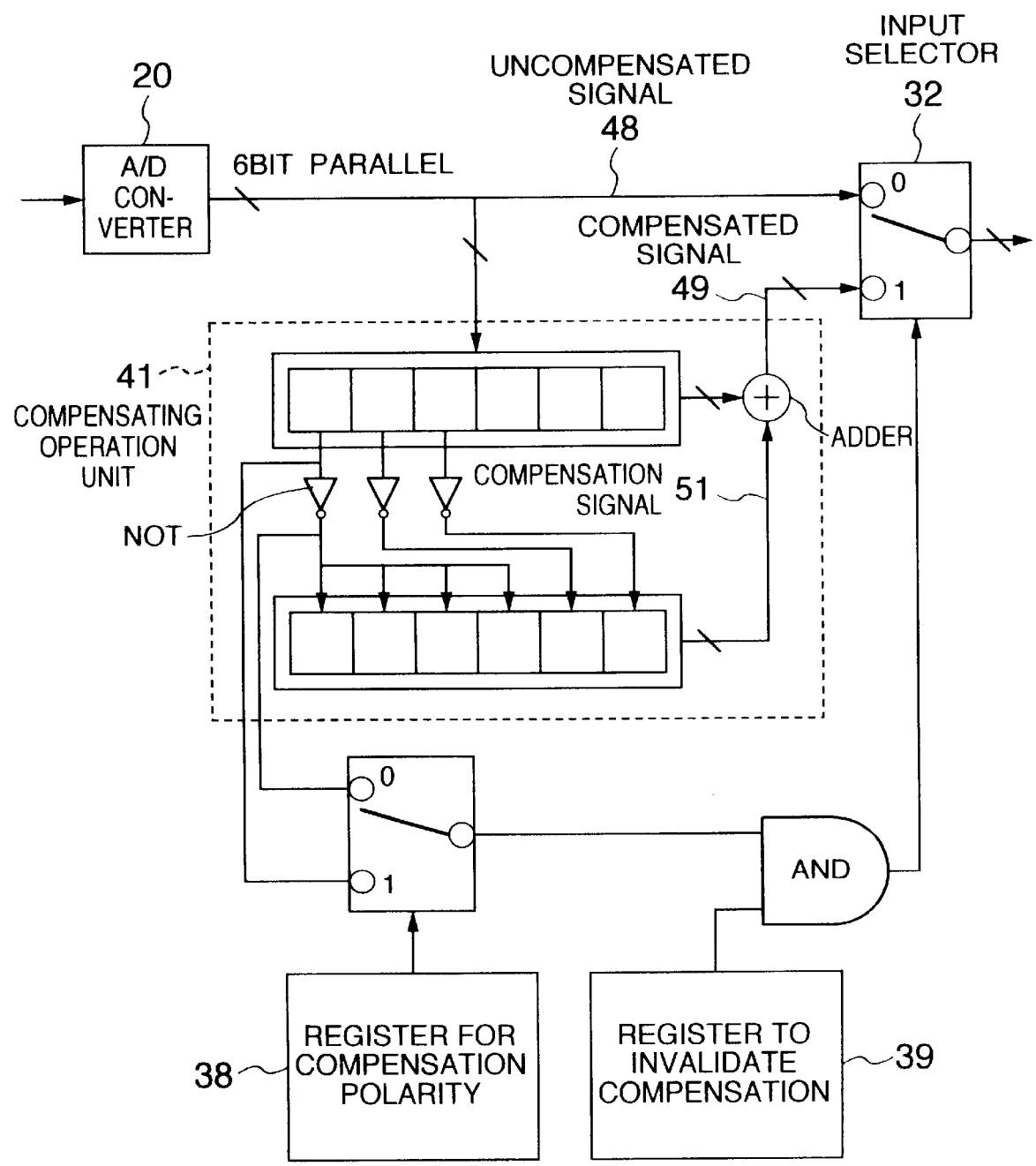
FIG. 4 is diagram showing a circuit configuration of an asymmetry compensation equalizer according to a second embodiment of the invention.

The asymmetry compensation equalizer according to the instant embodiment of the invention will be described by reference to FIG. 4. In the asymmetry compensation equalizer now under consideration, the multiplier of the asymmetry compensation coefficient and the threshold level decision unit are simplified on the prerequisite that the output data of the A/D converter 20 is of a 6-bit word length and represented by complements of "2". An compensating operation unit 41 outputs a value corresponding to "7/8" of the output of the A/D converter 20, which is equivalent to fixation of the asymmetry compensation coefficient 34 to "7/8" in the arrangement shown in FIG. 3. For determining the value "−1/8", two more significant bits exclusive of the most significant bit serving as a code bit are converted into two less significant bits with the most significant bits being converted to the remaining four more significant bits by inversion through the respective NOT circuit. In this way, the value "−1/8" (compensation signal 51) of the output of the A/D converter 20 can be determined. By adding this value to the original value, the value of "7/8" can be obtained. For the control of the compensation polarity, the most significant bit and the inverted value thereof are used. The compensation polarity control signal thus generated controls the input selector 32 in dependence on the outputs of the compensation polarity selecting register 38 and the compensation invalidating register 39, respectively.

Exemplary operation of the compensating operation unit 41 will be described. When the output of the A/D converter is "101111" (−17), then the compensating operation unit 41 outputs "000010" (2) as the compensation signal 51 through the bit operation mentioned above. By adding the compensation signal 51 to the output of the A/D converter, a corrected or compensated value 49 "110001" (−15) can be obtained. By neglecting three less significant bits, the compensating or correcting quantity is determined by using the most significant code bit and the two succeeding more significant bits. In that case, the less significant bits are rounded off. Consequently, the result of the computation may contain round-off error.

Figure 5:
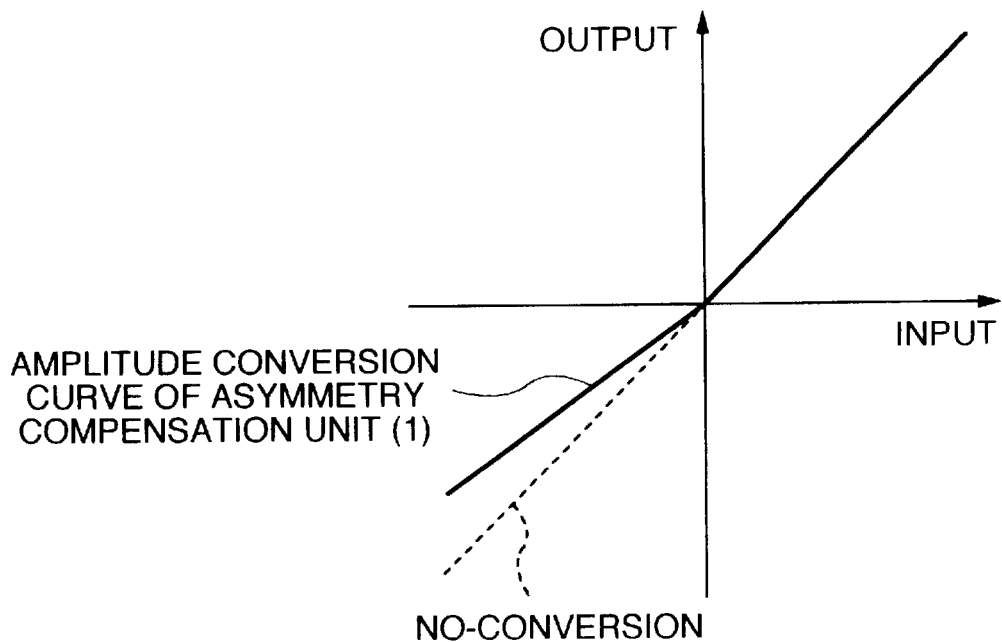
FIG. 5 is a view for illustrating graphically an input/output characteristic of an asymmetry compensator employed in the equalizer according to the second embodiment of the invention.

FIG. 5 illustrates, by way of example only, input-versus-output characteristic of the asymmetry compensation equalizer according to the instant embodiment of the invention. In actuality, the input value and the output value are given by discrete values. However, for the simplification of illustration, the input and output values are shown in the form of continuous values. The value of the compensation polarity selecting register 38 is "1". When the input value is negative, the value corresponding to the compression of the input by "7/8" (i.e., compensated signal 48) is outputted. On the other hand, when the input value is positive, the input value is outputted as it is (i.e., as the uncompensated signal 48).

EMBODIMENT 3

The third embodiment of the invention will now be described. It should first be mentioned that the third embodiment differs from the second one only in respect to a part of the structure of the asymmetry compensation equalizer.

The asymmetry compensation equalizer according to the instant embodiment of the invention will be described by reference to FIG. 6. In the asymmetry compensation equalizer now under consideration, the multiplier of the asymmetry compensation coefficient and the threshold level decision module are simplified on the prerequisite that the output data of the A/D converter 20 is of a 6-bit word length and represented by complements of "2". An compensating operation unit 42 outputs a value corresponding to "9/8" of the output of the A/D converter 20, which is equivalent to fixation of the asymmetry compensation coefficient 34 to "9/8" in the arrangement shown in FIG. 3 according to the first embodiment of the invention. For determining the value "1/8", two more significant bits exclusive of the most significant bit serving as the code bit are converted into two less significant bits with the most significant bits being converted to the remaining four more significant bits. In this way, the value "1/8" of the output of the A/D converter 20 can be determined. By adding this value to the original value, the value of "9/8" can be obtained. For the control of the compensation polarity, the most significant bit and the inverted value thereof are used. The compensation polarity control signal thus generated controls the input selector 32 in dependence on the outputs of the compensation polarity selecting register 38 and the compensation invalidating register 39, respectively.

Exemplary operation of the compensating operation unit 42 will be described. When the output of the A/D converter is "010000" (16), then the compensating operation unit 41 outputs "000010" (2) as the compensation signal 52 through the bit operation mentioned previously. By adding the compensation signal 52 to the output of the A/D converter, a corrected or compensated value 49 "010010" (18) can be outputted.

Figure 7:
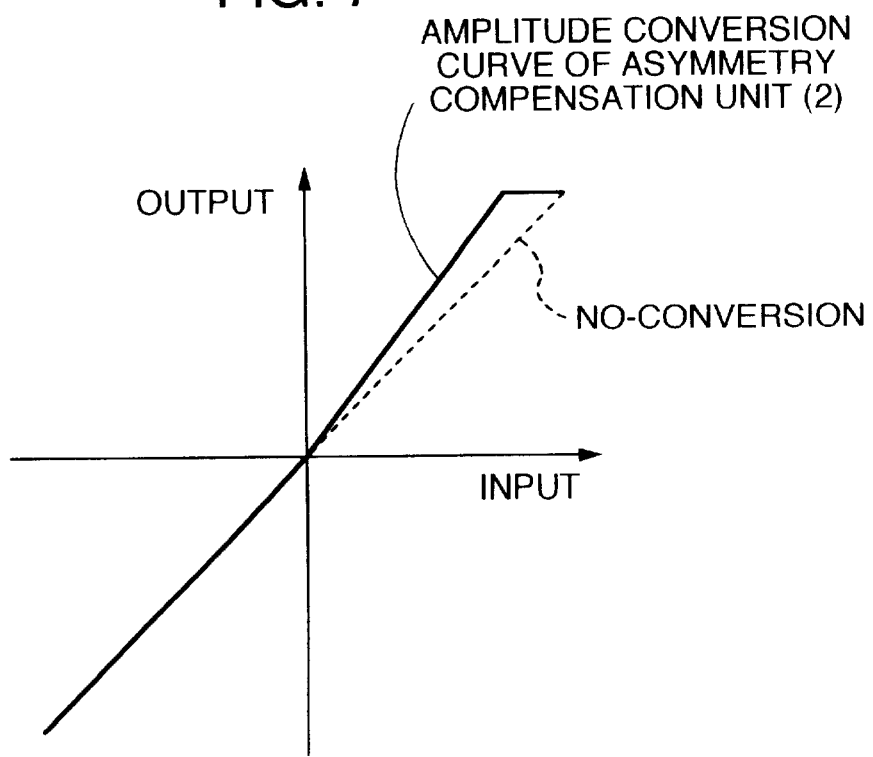
FIG. 7 is a view showing input/output characteristic of an asymmetry compensator employed in the equalizer according to the third embodiment of the invention.
Figure 8:
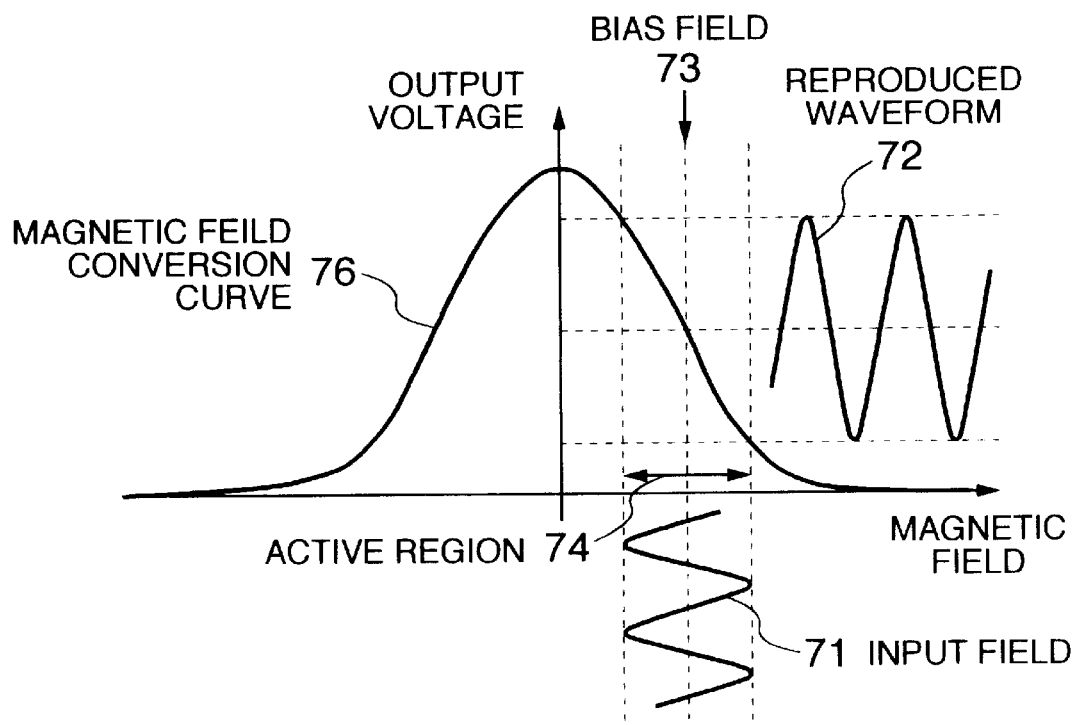
FIG. 8 is a view for graphically illustrating reproduction characteristic of an MR head.

FIG. 7 shows, by way of example only, input-versus-output characteristic of the asymmetry compensation equalizer according to the instant embodiment of the invention. In this case, the value of the compensation polarity selecting register 38 is "0". When the input value is positive, the amplified value corresponding to the input value multiplied by "9/8" is outputted. On the other hand, when the input value is negative, it is outputted intact.

In the compensating circuit according to the instant embodiment of the invention, the S/N ratio required for realizing the bit error rate "1E-5" can be reduced about 1.0 dB when the positive-negative asymmetry ratio of the reproduced waveform is 20%. In this conjunction, the positive-negative asymmetry ratio is defined as $(Ep-En)/(Ep+En)$ [%], where Ep and En represent, respectively, the amplitude values of the reproduced waveform of positive polarity and the reproduced waveform of the negative polarity when considered separately.

In the case of the asymmetry compensation equalizers according to the second and third embodiments of the invention, by selecting the asymmetry compensation coefficient as a power of "½", the multiplier of the input signal and the asymmetry compensation coefficient can be implemented in a simplified circuit structure, whereby the circuit scale can be made remarkably small.

In the foregoing description, it has been assumed that the present invention is applied to the PRML signal processing system. However, it goes without saying that the invention is never restricted to any specific signal processing system. By way of example, the invention can equally find application to the EPRML (extended PRML) signal processing system as well.

Figure 9:
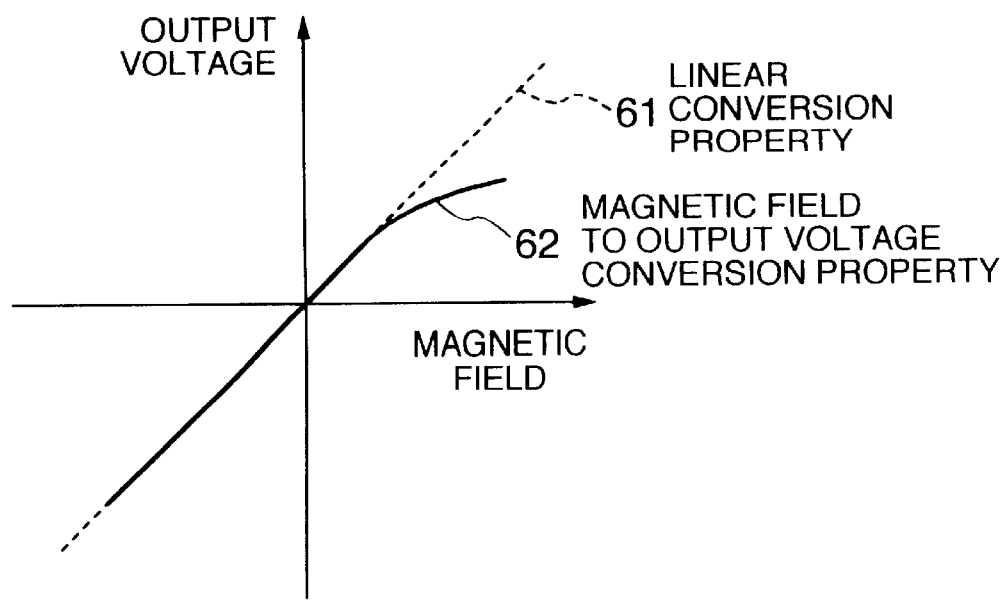
FIG. 9 is a view for illustrating positive-negative asymmetry due to non-linearity of an MR head.

The magnetic field-versus-output voltage conversion property 62 of the MR head may assume a curvilinear form deviated from the linear conversion property 61, as is illustrated in FIG. 9. In that case, by carrying out the compensation as described hereinbefore by reference to FIGS. 5 and 7 by amplifying the waveform of a given polarity having a small amplitude or compressing the waveform of a given polarity having large amplitude, compensation of the positive-negative asymmetry can be accomplished with an extremely simple circuit structure.

As will now be appreciated from the foregoing description, it is possible according to the teachings of the present invention to compensate or correct the waveform distortion ascribable to the non-linearity of the MR head with an extremely simple circuit structure. Accordingly, by combining the asymmetry compensation equalizer according to the invention with various conventional signal processing systems designed for processing the output signal of the MR head exhibiting non-linearity property, the system performance can be significantly enhanced. On the other hand, even the MR head exhibiting the non-linearity more remarkably can be employed while maintaining the system performance, which in turn means that the system such as the magnetic recording/reproducing apparatus can be manufactured with high yield at low cost, profitably from the economical standpoint.

What is claimed is:

1. A compensating circuit for compensating positive-negative asymmetry of an input signal having an amplitude exhibiting a positive-negative asymmetry with reference to a given level, comprising:

a multiplier having said input signal as an input and multiplying said input signal by a given number to provide a multiplied output signal; and a selector selecting one of said input signal and said multiplied signal to be output as a compensated signal either when said input signal has a level higher than a threshold level or when said input signal has a level lower than said threshold level.

2. A compensating circuit according to claim 1, and further including a compensation invalidating circuit for allowing an uncompensated signal to be output constantly regardless of the level of said input signal.

3. A compensating circuit according to claim 1, and further including:

an analog-to-digital converter digitizing said input signal; and wherein said multiplier comprises a digital circuit for arithmetically processing a digitized signal output from said analog-to-digital converter, said digital circuit including:

a register multiplying said input signal by a power of ½ by shifting an absolute value part of said input signal to obtain a determined value, and an adder adding or subtracting said determined value from said input signal.

4. A compensating circuit according to claim 3, wherein the output of said analog-to-digital converter is a series of binary bits representing the absolute value of said input signal and said register shifts said series of bits by three bits to obtain a value of ⅛ of said input signal, to be added to or subtracted from said input signal in said adder, and wherein said threshold level for selecting the output value is set at zero, with a decision for selecting the output value being made on the basis of a sign bit of said input signal.

5. An equalizer, comprising:

said compensating circuit as set forth in claim 1; and a transversal type filter following said compensating circuit.

6. A magnetic recording/reproducing apparatus, comprising:

an equalizer as set forth in claim 5; and a magnetic head operative under the magnetoresistive effect or alternatively under the giant magnetoresistive effect used as a reproducing head coupled to said equalizer.

7. A compensating circuit for compensating positive-negative asymmetry of an input signal having an amplitude exhibiting a positive-negative asymmetry with reference to a given level, comprising:

a multiplier having said input signal as an input and multiplying said input signal by a given number to provide a multiplied output signal;

a selector selecting one of said input signal and said multiplied signal to be output as a compensated signal either when said input signal has a level higher than a threshold level or when said input signal has a level lower then said threshold level; and a compensation polarity selector controlling said selection circuit to select either one of said input signal or said multiplied output signal as a compensated signal when said input signal has a level higher than a threshold level or either one of said input signal or said multiplied output signal as a compensated signal when said input signal has a level lower than said threshold level.

8. A compensating circuit according to claim 7, and further including:

a compensation invalidating register for allowing uncompensated values to be output constantly regardless of the level of said input signal (39).

9. A compensating circuit according to claim 7, and further including:

an analog-to-digital converter digitizing said input signal; and wherein said multiplier comprises a digital circuit for arithmetically processing a digitized signal output from said analog-to-digital converter, said digital circuit including:

a register multiplying said input signal by a power of ½ by shifting an absolute value part of said input signal to obtain a determined value, and an adder adding or subtracting said determined value from said input signal.

10. A compensating circuit according to claim 7, wherein:

the output of said analog-to-digital converter is a series of binary bits representing the absolute value of said input signal and said register shifts said series of bits by three bits to obtain a value of ⅛ of said input signal, to be added to or subtracted from said input signal in said adder.

11. A method of compensating positive-negative asymmetry of an input signal having an amplitude exhibiting a positive-negative asymmetry with reference to a given level, comprising:

multiplying said input signal by a given number to provide a multiplied output signal; and selecting one of said input signal and said multiplied signal to be output as a compensated signal either when said input signal has a level higher than a threshold level or when said input signal has a level lower then said threshold level.

12. A method according to claim 11, and further comprising selectively invalidating said selecting to allow an uncompensated signal to be output constantly regardless of the level of said input signal.

13. A method according to claim 11, and further including:

digitizing said input signal; and wherein said multiplying comprises arithmetically processing said digitized signal by multiplying said input signal by a power of ½ by shifting an absolute value part of said input signal to obtain a determined value, and adding or subtracting said determined value from said input signal.

14. A compensating circuit according to claim 13 wherein said digitized signal is a series of binary bits representing the absolute value of said input signal and said shifting comprises shifting said series of bits by three bits to obtain a value of ⅛ of said input signal, to be added to or subtracted from said input signal, and wherein said threshold level for selecting the output value is set at zero, with a decision for selecting the output value being made on the basis of a sign bit of said input signal.

* * * * *